US012754703B2

(12) United States Patent
He

(10) Patent No.: US 12,754,703 B2
(45) Date of Patent: Oct. 6, 2026

(54) MEDIA CONTENT DISPLAY METHOD AND APPARATUS, AND ELECTRONIC DEVICE AND STORAGE MEDIUM

(71) Applicant: Beijing Zitiao Network Technology Co., Ltd., Beijing (CN)

(72) Inventor: Siqi He, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/998,306

(22) PCT Filed: Dec. 14, 2023

(86) PCT No.: PCT/CN2023/138757
§ 371 (c)(1),
(2) Date: Jan. 24, 2025

(87) PCT Pub. No.: WO2024/140247
PCT Pub. Date: Jul. 4, 2024

(65) Prior Publication Data

US 2026/0037201 A1 Feb. 5, 2026

(30) Foreign Application Priority Data

Dec. 27, 2022 (CN) ........................ 202211690385.X

(51) Int. Cl.
*G06F 3/14* (2006.01)
*G09G 5/38* (2006.01)

(52) U.S. Cl.
CPC ................. *G06F 3/14* (2013.01); *G09G 5/38* (2013.01); *G09G 2340/0464* (2013.01)

(58) Field of Classification Search
CPC ..... G06F 3/14; G09G 5/38; G09G 2340/0464
See application file for complete search history.

(56) References Cited

U.S. PATENT DOCUMENTS

2010/0064251 A1 3/2010 Hufnagel et al.
2015/0149902 A1 5/2015 Zavesky et al.
(Continued)

FOREIGN PATENT DOCUMENTS

CN 106302548 A 1/2017
CN 107018331 A 8/2017
(Continued)

OTHER PUBLICATIONS

Japan Patent Office, Office Action Issued in Application No. 2024575679, Sep. 16, 2025, 10 pages. Cited ref. CN112424175A not included as it appears to be a typographical error for previously provided ref. CN112434175A.
(Continued)

*Primary Examiner* — Ryan A Lubit
(74) *Attorney, Agent, or Firm* — Alleman Hall LLP

(57) ABSTRACT

A media content display method and apparatus, and an electronic device and a storage medium are provided. The media content display method includes: receiving a display operation for target media content; and displaying a media content image of the target media content in response to the display operation, wherein the media content image includes a first image and a second image, the first image is in a first display state, and the second image is in a second display state.

19 Claims, 4 Drawing Sheets

(56) References Cited

U.S. PATENT DOCUMENTS

| | | | | |
|---|---|---|---|---|
| 2019/0222774 | A1* | 7/2019 | Kobayashi | G02B 27/017 |
| 2019/0354003 | A1* | 11/2019 | Ise | G03B 37/04 |
| 2021/0303027 | A1* | 9/2021 | Kim | H04M 1/0268 |
| 2023/0049339 | A1* | 2/2023 | Ganguly | G06V 10/25 |
| 2023/0269486 | A1* | 8/2023 | Xiao | H04N 23/73 348/222.1 |
| 2023/0331235 | A1* | 10/2023 | Shuman | G08G 1/16 |
| 2024/0040235 | A1* | 2/2024 | Huang | H04N 23/62 |
| 2024/0046412 | A1* | 2/2024 | Tanjim | G06T 3/4046 |
| 2024/0267627 | A1* | 8/2024 | Katz | G06V 10/25 |

FOREIGN PATENT DOCUMENTS

| | | | |
|---|---|---|---|
| CN | 110072056 | A | 7/2019 |
| CN | 111627399 | A | 9/2020 |
| CN | 112261428 | A | 1/2021 |
| CN | 112434175 | A | 3/2021 |
| CN | 114363011 | A | 4/2022 |
| CN | 114584797 | A | 6/2022 |
| CN | 115484385 | A | 12/2022 |
| CN | 115484392 | A | 12/2022 |
| CN | 116069221 | A | 5/2023 |
| JP | 2005303628 | A | 10/2005 |
| WO | 2022222773 | A1 | 10/2022 |

OTHER PUBLICATIONS

ISA China National Intellectual Property Administration, International Search Report Issued in Application No. PCT/CN2023/138757, Feb. 23, 2024, WIPO, 12 pages.

European Patent Office, Extended European Search Report Issued in Application No. 23910177.7, Apr. 8, 2026, Germany, 8 pages.

Japan Patent Office, Office Action Issued in Application No. 2024575679, Mar. 10, 2026, 8 pages.

China National Intellectual Property Administration, Office Action and Search Report Issued in Application No. 202211690385.X, Jun. 19, 2026, 16 pages.

* cited by examiner

MEDIA CONTENT DISPLAY METHOD AND APPARATUS, AND ELECTRONIC DEVICE AND STORAGE MEDIUM

CROSS-REFERENCE TO RELATED APPLICATIONS

This application is the national stage of International Patent Application No. PCT/CN2023/138757, filed on Dec. 14, 2023, which claims priority to Chinese Patent Application No. 202211690385.X, filed on Dec. 27, 2022. All the aforementioned patent applications are hereby incorporated by reference in their entireties.

TECHNICAL FIELD

Embodiments of the present disclosure relate to a media content display method and apparatus, an electronic device, and a storage medium.

BACKGROUND

In some cases, media content images of media content may be displayed for users. However, the way of displaying the media content images is single relatively.

SUMMARY

Embodiments of the present disclosure provide a media content display method and apparatus, an electronic device, and a storage medium.

In a first aspect, an embodiment of the present disclosure provides a media content display method, including:

- receiving a display operation for target media content; and
- displaying a media content image of the target media content in response to the display operation, wherein the media content image comprises a first image and a second image, the first image is in a first display state, and the second image is in a second display state.

In a second aspect, an embodiment of the present disclosure provides a media content display apparatus, including:

- a display operation reception module configured to receive a display operation for target media content; and
- an image display module configured to display a media content image of the target media content in response to the display operation, wherein the media content image includes a first image and a second image, the first image is in a first display state, and the second image is in a second display state.

In a third aspect, an embodiment of the present disclosure provides an electronic device, including:

- at least one processor; and
- a memory communicatively connected to the at least one processor; wherein
- the memory stores a computer program executable by the at least one processor, the computer program is executed by the at least one processor to enable the at least one processor to perform the media content display method of the embodiment of the present disclosure.

In a forth aspect, an embodiment of the present disclosure provides a computer-readable storage medium, wherein the computer-readable storage medium stores computer instructions, and the computer instructions, when executed, cause a processor to implement the media content display method of the embodiment of the present disclosure.

BRIEF DESCRIPTION OF DRAWINGS

The above and other features, advantages and aspects of embodiments of the present disclosure will become more apparent by referring to the following detailed description when taken in conjunction with the accompanying drawings. Throughout the drawings, the same or similar reference numerals indicate the same or similar elements. It should be understood that the drawings are schematic, and the component and elements are not necessarily drawn to scale.

DETAILED DESCRIPTION

Embodiments of the present disclosure will be described in more detail below with reference to the accompanying drawings. Although some embodiments of the present disclosure are shown in the accompanying drawings, it should be understood that the present disclosure can be embodied in various forms and should not be construed as limited to the embodiments set forth here, but rather, these embodiments are provided for a more thorough and complete understanding of the present disclosure. It should be understood that the accompanying drawings and embodiments of the present disclosure are only used for illustrative purposes, and are not used to limit the protection scope of the present disclosure.

It should be understood that the steps described in the method implementations of the present disclosure may be performed in a different order and/or in parallel. Furthermore, method embodiments may include additional steps and/or omit performing the illustrated steps. The scope of the present disclosure is not limited in this respect.

As used herein, the term "including" and its variants are open-ended including, that is, "including but not limited to". The term "based on" is "at least partially based on". The term "one embodiment" means "at least one embodiment". The term "another embodiment" means "at least one other embodiment". The term "some embodiments" means "at least some embodiments". Related definitions of other terms will be given in the following description.

It should be noted that the concepts of "first" and "second" mentioned in this disclosure are only used to distinguish different devices, modules or units, and are not used to limit the order or interdependence of the functions performed by these devices, modules or units.

It should be noted that the modifications of "a" and "a plurality" mentioned in this disclosure are schematic rather than limiting, and those skilled in the art should understand that unless the context clearly indicates otherwise, they should be understood as "one or more".

The names of messages or information in interaction among a plurality of apparatuses in the embodiment of present disclosure are for illustrative purposes only and are not intended to limit the scope of such messages or information.

Figure 1:
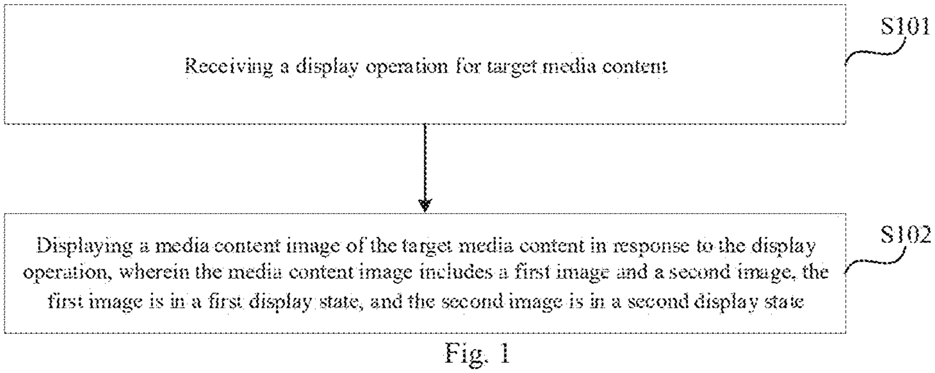
FIG. 1 is a schematic flowchart of a media content display method according to an embodiment of the present disclosure.

FIG. 1 is a schematic flowchart of a media content display method according to an embodiment of the present disclosure. The method may be performed by a media content display apparatus. The apparatus may be implemented by software and/or hardware and may be configured in an electronic device, e.g., may be configured in a cell phone or a tablet PC. The media content display method provided in the embodiment of the present disclosure is applicable to a scene of displaying a media content image, and is particularly applicable to a scene of displaying different areas of a media content image in different display states. As shown in FIG. 1, the media content display method provided in this embodiment may include the following steps.

S101: receiving a display operation for target media content.

Herein, the display operation may be a triggering operation for indicating the display of a certain media content, such as a triggering operation for switching from another page to a media content display page to display the media content in the media content display page, or a media content switching operation acting in the media content display page, and the like. The target media content may be media content indicated to be displayed by the display operation, which may be preset media content, such as media content published by a publisher in a preset manner, which may be displayed in a media content stream, and exemplarily, the media content stream may include multiple published media content pushed by a platform. The preset media content may be understood as media content of which the media content image having a first display state and a second display state. The preset media content may be, for example, a video, a picture and/or a graphic text. This embodiment does not impose limitations on the type of the preset media content.

In this embodiment, when a user intends to view a certain media content, e.g., a certain preset media content, the user may perform a display operation for the media content. Accordingly, the current application program may receive the display operation performed by the user.

S102: displaying a media content image of the target media content in response to the display operation, wherein the media content image includes a first image and a second image, the first image is in a first display state, and the second image is in a second display state.

The first image may be considered to be an image in the media content image of the target media content that is displayed in the first display state, and the second image may be considered to be an image in the media content image of the target media content that is displayed in the second display state. When the target media content includes only one picture, the first image and the second image may be images in different areas of the picture, such as in different areas of the media content image of the target media content. When the target media content includes multiple pictures or multiple video frames, the first image and the second image may be located in different areas of at least part of the pictures/video frames of the target media content, or may be media content images displayed in different pictures/video frames of the target media content. The following is an example of the first image and the second image being located in different areas of the pictures/video frames contained in the target media content. Here, each pictures/video frame contained in the target media content may include the first image and the second image.

It can be understood that when the first image includes multiple pictures and/or multiple video images, the first image being in the first display state means that at least part of the pictures and/or video frames in the first image are in the first display state; when the second image includes multiple pictures and/or multiple video images, the second image being in the second display state means that at least some of the images and/or video images in the second image are in the second display state.

The first display state and the second display state may be two different display states of the media content image. The two different display states may be set according to needs, for example, the first display state may be a state of displaying the media content image with a first resolution, and the second display state may be a state of displaying the media content image with a second resolution. The first resolution and the second resolution may be different resolutions. Exemplarily, the first resolution may be an original resolution of the media content image, i.e., the original resolution the media content when it is published, and the second resolution may be smaller than the first resolution.

Optionally, the first image is in a first display state and the second image is in a second display state, which includes the first image is in a clear display state and the second image is in a blurry display state. In other words, the first display state may be the clear display state and the second display state may be the blurry display state.

Herein, the clear display state may be considered as a non-blurry display state. Exemplarily, the clear display state may be an original display state of the media content image, for example, the image in the clear display state may be displayed in the manner of an original image at the time of publication of the target media content. The blurry display state may be a state in which the media content image is displayed in a blurry manner. Optionally, the image in the blurry display state may be obtained by blur processing on the original image of the target media content. Exemplarily, the current application program may perform the blur processing on the original media content image of the target media content directly or through a server, such as adding a mosaic or performing Gaussian blur in the corresponding area of the original media content image during displaying, without performing the blur processing in areas other than the corresponding area, so as to obtain the media content image including an image in the blurry display state and an image in the clear display state, for displaying the media content image. Herein, the original image may be understood to be an original media content image of the target media content, i.e., the original image of the target media content published by the publisher of the target media content.

Figure 2:
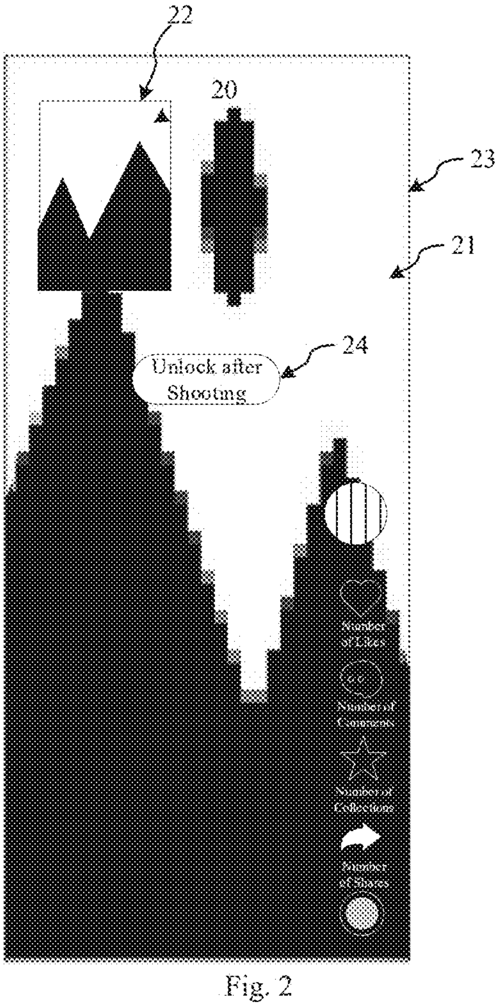
FIG. 2 is a schematic diagram of displaying a media content image according to an embodiment of the present disclosure.

Exemplarily, when a display operation for the target media content is received, a media content image of the target media content may be displayed in a different display state in response to the display operation, for example, a first image 20 contained in the media content image of the target media content is displayed in the first display state, and a second image 21 contained in the media content image of the target media content is displayed in the second display state, as shown in FIG. 2.

In some implementations, the user may adjust a relative position of the first image and the second image according to needs. Optionally, after displaying the media content image of the target media content, the method further includes: receiving an image position adjustment operation for the target media content; and adjusting the relative position of the first image and the second image in response to the image position adjustment operation.

Herein, the image position adjustment operation may be a trigger operation for indicating the adjustment of the relative position of the first image and the second image, such as a drag operation for the first image or the second image or a trigger operation acting on a corresponding control.

Specifically, when the user intends to adjust the relative position of the first image and the second image, the image position adjustment operation for the target media content may be performed, such as the drag operation for the first image or the second image may be performed. Accordingly, the current application program may receive the image position adjustment operation performed by the user, and may, in response to the image position adjustment operation, adjust the relative position of the first image and the second image, such as controlling the first image/second image to move in response to the drag operation by the user, and may further adaptively adjust the position of the second image/first image in the process of controlling the first image/second image to move, so as to adjust the relative position of the first image and the second image.

In the process of adjusting the relative position of the first image and the second image, exemplarily, if the first image and the second image are displayed within the same layer, the position of the image in the clear display state/blurry display state in the layer may be adjusted in accordance with the relative position adjustment operation by the user, for example, a preset display window may be controlled to be moved in the media content display page in accordance with the image position adjustment operation by the user, a media content image in the display window may be displayed in the first display state while a media content image located outside the display window is displayed in the second display state. If the first image and the second image are displayed in different layers, for example, assuming that a first layer corresponding to the first image is located above a second layer corresponding to the second image, the first image in the first layer may be displayed in the first display state, the second image in the second layer may be displayed in the second display state, and in accordance with the image position adjustment operation by the user, a display position of the first image in the first layer may be adjusted, and thus the relative position of the first image and the second image may be adjusted.

For example, as shown in FIG. 2, assuming that a display size of the first image 20 is smaller than a display size of the second image 21, the user may control the movement of the first image 20 in the media content display page through the image position adjustment operation so that the first image 21 may be displayed at different positions of the media content.

The media content display method provided in this embodiment includes receiving a display operation for target media content; and displaying a media content image of the target media content in response to the display operation, wherein the media content image of the target media content includes a first image and a second image, the first image is in a first display state, and the second image is in a second display state. With the above technical solution adopted in this embodiment, different images of the target media content are displayed in different display states, which can enrich the way of displaying the media content image.

Figure 3:
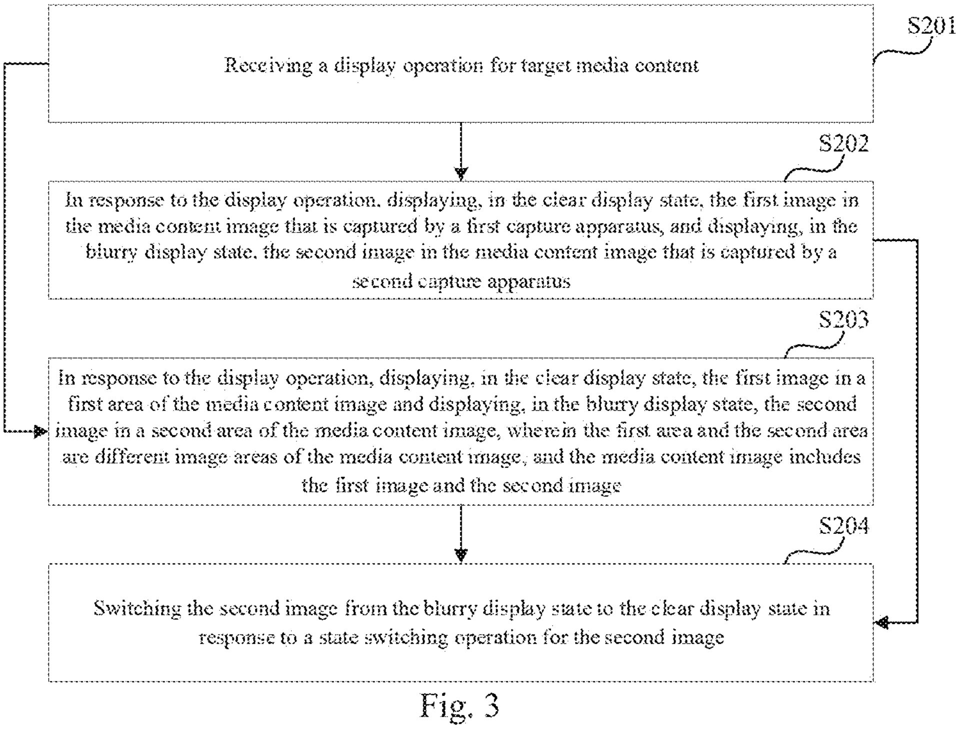
FIG. 3 is a schematic flowchart of another media content display method according to an embodiment of the present disclosure.

FIG. 3 is a schematic flowchart of another media content display method according to an embodiment of the present disclosure. The solution in this embodiment may be combined with one or more optional solutions in the above embodiments. Optionally, displaying the media content image of the target media content includes: displaying, in the clear display state, the first image in the media content image that is captured by a first capture apparatus, and displaying, in the blurry display state, the second image in the media content image that is captured by a second capture apparatus.

Optionally, displaying the media content image of the target media content includes: displaying the first image in a first area of the media content image in the clear display state and displaying the second image in a second area of the media content image in the blurry display state, where the first area and the second area are different image areas of the media content image.

Optionally, after displaying the media content image of the target media content, the method further includes: switching the second image from the blurry display state to the clear display state in response to a state switching operation for the second image.

Accordingly, as shown in FIG. 3, the media content display method provided in this embodiment may include:

S201: receiving a display operation for target media content, and performing step S202 or S203.

S202: in response to the display operation, displaying, in the clear display state, the first image in the media content image that is captured by a first capture apparatus, and displaying, in the blurry display state, the second image in the media content image that is captured by a second capture apparatus, and performing step S204, wherein the media content image includes the first image and the second image.

In this embodiment, images in the target media content that are captured by different capture apparatuses are displayed in different display states in accordance with the difference of the capture apparatuses.

Exemplarily, the first image 20 in the media content image of the target media content that is captured by the first capture apparatus may be displayed in a clear state, and the second image 21 in the media content image of the target media content that is captured by the second capture apparatus may be displayed in a blurry state, as shown in FIG. 2.

The first capture apparatus and the second capture apparatus may be different capture apparatuses configured on a same electronic device. The capture apparatuses may, for example, be cameras or other devices having shooting functions.

Optionally, the first capture apparatus is a front camera of the target electronic device and the second capture apparatus is a rear camera of the target electronic device; or, the first capture apparatus is a rear camera of the target electronic device and the second capture apparatus is a front camera of the target electronic device; wherein the target electronic device is a capture device for the target media content.

Herein, the target electronic device may be considered to be an electronic device used by a publisher of the target media content when shooting the target media content or when shooting the media content material used in the target media content. The first capture apparatus and the second capture apparatus may be different cameras configured on the target electronic device.

For example, the first capture apparatus may be a front camera of the target electronic device and the second capture apparatus may be a rear camera of the target electronic device. Therefore, the first image may be an image in the target media content that is captured by the front camera of the target electronic device, and the second image may be an image in the target media content that is captured by the rear camera of the target electronic device. Here, after a display operation for the target media content is received, in response to the display operation, the first image in the target media content that is captured by the front camera of the target electronic device may be displayed in a clear state and the second image in the target media content that is captured by the rear camera of the target electronic device may be displayed in a blurry state.

As another example, the first capture apparatus may be a rear camera of the target electronic device and the second capture apparatus may be a front camera of the target electronic device. Therefore, the first image may be an image in the target media content that is captured by the rear camera of the target electronic device, and the second image may be an image in the target media content that is captured by the front camera of the target electronic device. Here, when a display operation for the target media content is received, in response to the display operation, the first image in the target media content that is captured by the rear camera of the target electronic device may be displayed in a clear state and the second image in the target media content that is captured by the front camera of the target electronic device may be displayed in a blurry state.

S203: in response to the display operation, displaying, in the clear display state, the first image in a first area of the media content image and displaying, in the blurry display state, the second image in a second area of the media content image, wherein the first area and the second area are different image areas of the media content image, and the media content image includes the first image and the second image.

In this embodiment, images in different areas of the media content image of the target media content may be displayed in different display states in accordance with the difference of the display areas.

Exemplarily, the first image 20 in a first area 22 of the media content image of the target media content may be displayed in a clear state, and the second image 21 in a second area 23 of the media content image of the target media content may be displayed in a blurry state, as shown in FIG. 2.

Herein, the first area and the second area may be different areas of the media content image of the target media content, and the method for dividing the first area and the second area may be flexibly set according to needs. The first image may be an image in the first area of the media content image of the target media content, and the second image may be an image in the second area of the media content image of the target media content.

In some implementations, the first area and the second area may be divided according to the difference in display positions of the images captured by different capture apparatuses. For example, an area in which the image captured by one capture apparatus is located in the media content image of the target media content may be considered as the first area, and the area in which an image captured by another capture apparatus is located in the media content image of the target media content may be considered as the second area. Here, optionally, the first image and the second image are captured by different capture apparatuses. The different capture apparatuses may be different capture apparatuses configured on a same electronic device, such as the front camera and the rear camera of the electronic device.

Taking the first area being a display area for an image captured by the front camera of the target electronic device and the second area being a display area for an image captured by the rear camera of the target electronic device as an example, the media content image of the target media content may contain the image captured by the front camera of the target electronic device and the image captured by the rear camera of the target electronic device. Here, the area in which the image captured by the front camera of the target electronic device is displayed may be taken as the first area, the area in which the image captured by the rear camera of the target electronic device is displayed may be taken as the second area, and the first image (e.g., the image captured by the front camera of the target electronic device) in the first area is displayed in the clear display state, and the second image (e.g., the image captured by the rear camera of the target electronic device) in the second area is displayed in the blurry display state.

In the above implementations, the first area and the second area may also be determined based on the differences in display positions and display sizes of the images captured by the different capture apparatuses. Here, optionally, a size of the first area is less than or equal to a size of the second area, or the size of the first area is greater than the size of the second area.

For example, the areas in which the images captured by the respective capture apparatuses are located in the media content image of the target media content may be determined separately; the area with a smaller/larger area size among the determined areas is taken as the first area, and the areas other than the first area among the determined areas are taken as the second areas.

Taking the media content image of the target media content including the image captured by the front camera as well as the image captured by the rear camera of the target electronic device as an example, the area in which the image captured by the front camera of the target electronic device is located in the media content image of the target media content and the area in which the image captured by the rear camera of the target electronic device is located in the media content image of the target media content may be determined first respectively, the area with the smaller/larger area size of the determined two areas serves as the first area and the area with the smaller/larger area size serves as the second area; and then, the first image in the first area of the media content image of the target media content is displayed in the clear display state, and the second image in the second area of the media content image of the target media content is displayed in the blurry display state.

In some implementations, it is possible to disregard whether the media content image of the target media content contains images captured by the different capture apparatuses, and it is also possible to disregard positions of the images captured by the respective capture apparatuses in the media content image of the target media content. For example, the position of the first area may be preset, such as a preset area is pre-designated as the first area, or an image area is randomly determined as the first area corresponding to the target media content; and an image area other than the first area of the media content image of the target media content may serve as the second area. The image in the first area of the media content image of the target media content is displayed in the clear display state, and the image in the second area of the media content image of the target media content is displayed in the blurry display state. Optionally, the first area is a preset area or a random area of the media content image, and the second area is an image area other than the first area of the media content image.

It can be understood that, for a case that the first area being a random area, when a same user views the target media content at different time or for different times on the same electronic device, the positions of the first area and the second area of the media content image of the target media content may be the same or different. When the same user logs in to the same account on different electronic devices to view the target media content, the positions of the first area and the second area of the media content image of the target media content may be the same or different. When different users view the target media content, the positions of the first area and the second area of the media content image of the target media content may be the same or different. This embodiment does not impose limitations thereon.

S204: switching the second image from the blurry display state to the clear display state in response to a state switching operation for the second image.

The state switching operation may be a triggering operation for indicating switching the second image which is contained in the media content image of the target media content and is in the blurry display state to the clear display state. Exemplarily, the state switching operation may include a triggering operation for indicating the publication of preset media content, a preset interaction operation with the target media content, and/or a relationship establishment operation performed for the n-th (n is a positive integer) time after the display operation for the target media content is received, and the like. The relationship establishment operation may, for example, be a triggering operation by the user for indicating following one or more other users other than the user himself/herself.

In this embodiment, when the first image of the media content image of the target media content is displayed in the clear display state and the second image of the media content image of the target media content is displayed in the blurry display state, the user may switch the second image of the media content image of the target media content that is in the blurry display state to the clear display state by performing the state switching operation so as to view the media content image of the target media content in the clear display state.

Figure 4:
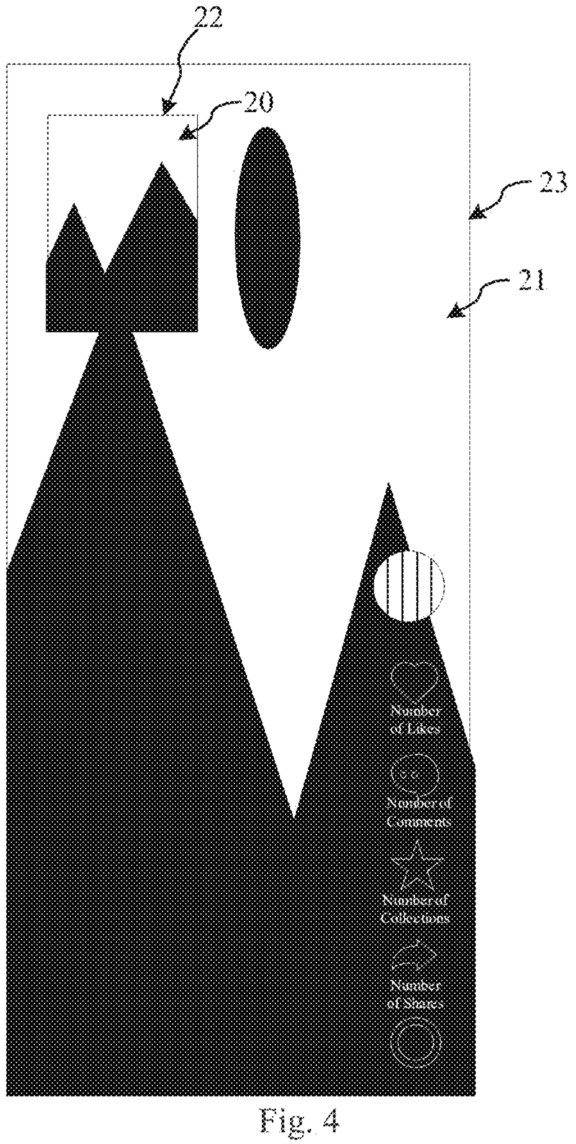
FIG. 4 is a schematic diagram of displaying another media content image according to an embodiment of the present disclosure.

For example, when the user intends to view the media content image of the target media content in the clear display state, the user may perform a trigger operation for indicating the publication of the preset media content, such as entering a shooting page by triggering a shooting control 24 (shown in FIG. 2) displayed in the media content display page, shooting the media content in the shooting page, and publishing the media content as the preset media content. Accordingly, the current application program may switch the second image 21, in the blurry display state, of the media content image of the target media content from the blurry display state to the clear display state, after the user publishes the preset media content, as shown in FIG. 4, when detecting that the user performs a publishing operation of the preset media content.

For another example, when the user intends to view the media content image of the target media content in the clear display state, the user may perform a preset interactive operation for the target media content, such as liking, commenting on or sharing the target media content, or sending a session message to the publisher of the target media content, and the like. Accordingly, the current application program may switch the second image 21, in the blurry display state, of the media content image of the target media content from the blurry display state to the clear display state when detecting that the user performs the preset interactive operation, as shown in FIG. 4.

For yet another example, when the user intends to view the media content image of the target media content in the clear display state, the user may perform the relationship establishment operation for n times, such as building a relationship of follow with n other users to whom he or she has not yet followed. Accordingly, the current application program may switch the second image 21, in the blurry display state, of the media content image of the target media content from the blurry display state to the clear display state, as shown in FIG. 4, when detecting that the user performs the relationship establishment operation for the n-th time, such as when it is determined that the user has newly followed n other users. Herein, n may be flexibly set according to needs, such as n may be set to 1, 2, or 5.

By the media content display method provided in this embodiment, a part of the images in the media content image of the target media content may be displayed in the clear display state while the other part of images in the media content image of the target media content may be displayed in the blurry display state by different ways, and the image in the blurry display state may be switched to the clear display state based on the state switching operation of the user, so that the way of displaying the media content image and switching the display state of the media content image can be further enriched.

Figure 5:
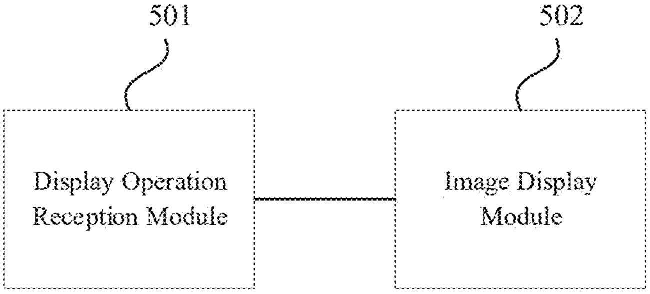
FIG. 5 is a structural block diagram of a media content display apparatus according to an embodiment of the present disclosure.

FIG. 5 is a structural block diagram of a media content display apparatus according to an embodiment of the present disclosure. The apparatus may be implemented by software and/or hardware, may be configured in an electronic device, for example, may be configured in a cell phone or a tablet PC. It may display a media content image by executing the media content display method, such as a scene of displaying different areas of the media content image in different display states. As shown in FIG. 5, the media content display apparatus provided in this embodiment may include a display operation reception module 501 and an image display module 502, wherein the display operation reception module 501 is configured to receive a display operation for target media content; and the image display module 502 is configured to display a media content image of the target media content in response to the display operation, where the media content image includes a first image and a second image, the first image is in a first display state, and the second image is in a second display state.

In the media content display apparatus provided in this embodiment, a display operation for target media content is received by the display operation reception module; and a media content image of the target media content is displayed by the image display module in response to the display operation, where the media content image of the target media content includes a first image and a second image, the first image is in a first display state, and the second image is in a second display state. With the above technical solution adopted in this embodiment, different images of the target media content are displayed in different display states, which can enrich the way of displaying the media content image.

In the above solution, the first image is in a first display state and the second image is in a second display state, which includes the first image is in a clear display state and the second image is in a blurry display state.

In the above solution, the image display module 502 may be configured to display, in the clear display state, the first image in the media content image that is captured by a first capture apparatus, and display, in the blurry display state, the second image in the media content image that is captured by a second capture apparatus.

In the above solution, the first capture apparatus is a front camera of the target electronic device and the second capture apparatus is a rear camera of the target electronic device; or, the first capture apparatus may be a rear camera of the target electronic device and the second capture apparatus may be a front camera of the target electronic device; where the target electronic device is a capture device for the target media content.

In the above solution, the image display module 502 may be configured to: display the first image in a first area of the media content image in the clear display state and display the second image in a second area of the media content image in the blurry display state, wherein the first area and the second area are different image areas of the media content image.

In the above solution, the first image and the second image may be captured by different capture apparatuses.

In the above solution, a size of the first area is less than or equal to a size of the second area, or the size of the first area is greater than the size of the second area.

In the above solution, the first area is a preset area or a random area of the media content image, and the second area is an image area other than the first area of the media content image.

Furthermore, the media content display apparatus provided in this embodiment may include a state switching module configured to switch the second image from the blurry display state to the clear display state in response to a state switching operation for the second image after the media content image of the target media content is displayed.

Furthermore, the media content display apparatus provided in this embodiment may include an adjustment operation receiving module configured to receive an image position adjustment operation for the target media content after the media content image of the target media content is displayed; and a position adjustment module configured to adjust the relative position of the first image and the second image in response to the image position adjustment operation.

The media content display apparatus provided in the embodiment of the present disclosure may execute the media content display method provided in any embodiment of the present disclosure, and has the corresponding functional modules for executing the media content display method and beneficial effects. Technical details not exhaustively described in this embodiment may be found in the media content display method provided in any embodiment of the present disclosure.

Figure 6:
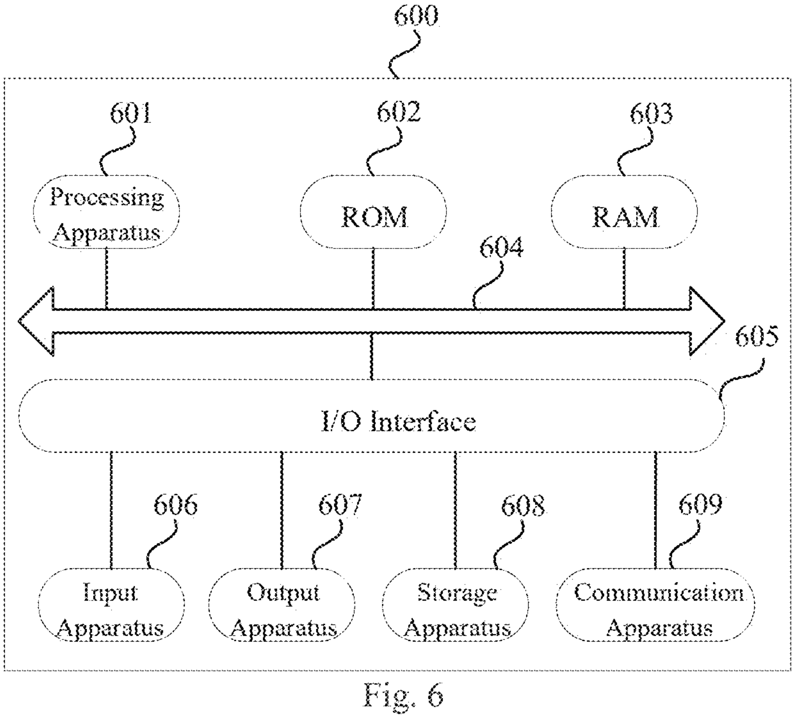
FIG. 6 is a schematic structural diagram of an electronic device according to an embodiment of the present disclosure.

Referring to FIG. 6, FIG. 6 illustrates a schematic structural diagram of an electronic device 600 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 6 is merely an example, and should not pose any limitation to the functions and the range of use of the embodiments of the present disclosure.

As illustrated in FIG. 6, the electronic device 600 may include a processing apparatus 601 (e.g., a central processing unit, a graphics processing unit, etc.), which can perform various suitable actions and processing according to a program stored in a read-only memory (ROM) 602 or a program loaded from a storage apparatus 608 into a random-access memory (RAM) 603. The RAM 603 further stores various programs and data required for operations of the electronic device 600. The processing apparatus 601, the ROM 602, and the RAM 603 are interconnected by means of a bus 604. An input/output (I/O) interface 605 is also connected to the bus 604.

Usually, the following apparatus may be connected to the I/O interface 605: an input apparatus 606 including, for example, a touch screen, a touch pad, a keyboard, a mouse, a camera, a microphone, an accelerometer, a gyroscope, or the like; an output apparatus 607 including, for example, a liquid crystal display (LCD), a loudspeaker, a vibrator, or the like; a storage apparatus 608 including, for example, a magnetic tape, a hard disk, or the like; and a communication apparatus 609. The communication apparatus 609 may allow the electronic device 600 to be in wireless or wired communication with other devices to exchange data. While FIG. 4 illustrates the electronic device 600 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 609 and installed, or may be installed from the storage apparatus 608, or may be installed from the ROM 602. When the computer program is executed by the processing apparatus 601, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: receive a display operation for target media content; and display a media content image of the target media content in response to the display operation, wherein the media content image comprises a first image and a second image, the first image is in a first display state, and the second image is in a second display state.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances. For example, the first acquisition module can also be described as "a module for acquiring the time information of the target resource to-be-inserted in the target track".

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one or more embodiments of the present disclosure, Example 1 provides a media content display method, including:

receiving a display operation for target media content;

and displaying a media content image of the target media content in response to the display operation, where the media content image includes a first image and a second image, the first image is in a first display state, and the second image is in a second display state.

According to one or more embodiments of the present disclosure, Example 2 is based on the method described in Example 1, wherein the first image is in the first display state and the second image is in the second display state includes:

the first image is in a clear display state and the second image is in a blurry display state.

According to one or more embodiments, Example 3 is based on the method described in Example 2, wherein displaying the media content image of the target media content includes:

displaying, in the clear display state, the first image in the media content image that is captured by a first capture apparatus, and displaying, in the blurry display state, the second image in the media content image that is captured by a second capture apparatus.

According to one or more embodiments of the present disclosure, Example 4 is based on the method described in Example 3, wherein the first capture apparatus is a front camera of a target electronic device and the second capture apparatus is a rear camera of the target electronic device; or the first capture apparatus is a rear camera of the target electronic device and the second capture apparatus is a front camera of the target electronic device;

wherein the target electronic device is a capture device for the target media content.

According to one or more embodiments, Example 5 is based on the method described in Example 2, wherein displaying the media content image of the target media content includes:

displaying the first image in a first area of the media content image in the clear display state and displaying the second image in a second area of the media content image in the blurry display state, where the first area and the second area are different image areas of the media content image.

According to one or more embodiments, Example 6 is based on the method described in Example 5, wherein the first image and the second image are captured by different capture apparatuses.

According to one or more embodiments, Example 7 is based on the method described in Example 6, wherein a size of the first area is less than or equal to a size of the second area, or the size of the first area is greater than the size of the second area.

According to one or more embodiments, Example 8 is based on the method described in Example 5, wherein the first area is a preset area or a random area of the media content image, and the second area is an image area other than the first area of the media content image.

According to one or more embodiments, Example 9 is based on the method described in any one of Examples 2 to 8, wherein after displaying the media content image of the target media content, the method further includes:

switching the second image from the blurry display state to the clear display state in response to a state switching operation for the second image.

According to one or more embodiments, Example 10 is based on the method described in any one of Examples 1 to 8, where after displaying the media content image of the target media content, the method further includes:

receiving an image position adjustment operation for the target media content;

and adjusting the relative position of the first image and the second image in response to the image position adjustment operation.

According to one or more embodiments of the present disclosure, Example 11 provides a media content display apparatus, including:

a display operation reception module configured to receive a display operation for target media content;

and an image display module configured to display a media content image of the target media content in response to the display operation, wherein the media content image includes a first image and a second image, the first image is in a first display state, and the second image is in a second display state.

According to one or more embodiments of the present disclosure, Example 12 provides an electronic device, including:

one or more processors; and a memory for storing one or more programs;

wherein when the one or more programs are executed by the one or more processors, the one or more processors are caused to implement the media content display method in any one of Examples 1 to 10.

According to one or more embodiments of the present disclosure, Example 13 provides a computer-readable storage medium, in which a computer program is stored, and when executed by a processor, the program implements any of the media content display method in any of Examples 1 to 10.

The above description is only a preferred embodiment of the present disclosure and an explanation of the technical principles used. Those skilled in the art should understand that the scope of disclosure involved in the present disclosure is not limited to the technical solutions formed by the specific combination of the above technical features, but should also cover other technical solutions formed by any combination of the above technical features or their equivalent features without departing from the above disclosure concept. For example, the above features are replaced with (but not limited to) technical features with similar functions disclosed in the present disclosure.

In addition, although the operations are depicted in a specific order, this should not be understood as requiring these operations to be performed in the specific order shown or in a sequential order. In certain environments, multitasking and parallel processing may be advantageous. Similarly, although several specific implementation details are included in the above discussion, these should not be interpreted as limiting the scope of the present disclosure. Certain features described in the context of separate embodiments can also be implemented in a single embodiment in combination. Conversely, the various features described in the context of a single embodiment can also be implemented in multiple embodiments individually or in any suitable subcombination.

Although the subject matter has been described in language specific to structural features and/or method logic actions, it is to be understood that the subject matter defined in the appended claims is not necessarily limited to the specific features or actions described above. On the contrary, the specific features and actions described above are merely example forms of implementing the claims. Regarding the apparatus in the above embodiment, the specific manner in which each module performs the operation has been described in detail in the embodiment related to the method, and will not be elaborated here.

The invention claimed is:

1. A media content display method, comprising:

receiving a display operation for media content; and displaying a media content image of the media content in response to the display operation, wherein the media content image comprises a first image and a second image, the first image is in a clear display state, and the second image is in a blurry display state, wherein displaying the media content image of the media content comprises displaying, in the clear display state, the first image in the media content image that is captured by a first capture apparatus, and displaying, in the blurry display state, the second image in the media content image that is captured by a second capture apparatus, wherein the first capture apparatus is a front camera of an electronic device and the second capture apparatus is a rear camera of the electronic device; or the first capture apparatus is a rear camera of the electronic device and the second capture apparatus is a front camera of the electronic device, and wherein the electronic device is a capture device for the media content.

2. The method of claim 1, wherein displaying the media content image of the media content comprises:

displaying, in the clear display state, the first image located in a first area of the media content image, and displaying, in the blurry display state, the second image located in a second area of the media content image, wherein the first area and the second area are different image areas of the media content image.

3. The method of claim 2, wherein the first image and the second image are captured by different capture apparatuses.

4. The method of claim 3, wherein a size of the first area is less than or equal to a size of the second area.

5. The method of claim 3, wherein a size of the first area is greater than a size of the second area.

6. The method of claim 2, wherein the first area is a preset area of the media content image, and the second area is an image area other than the first area of the media content image.

7. The method of claim 1, wherein after displaying the media content image of the media content, the method further comprises:

switching the second image from the blurry display state to the clear display state in response to a state switching operation for the second image.

8. The method of claim 1, wherein after displaying the media content image of the media content, the method further comprises:

receiving an image position adjustment operation for the media content; and adjusting a relative position of the first image and the second image in response to the image position adjustment operation.

9. An electronic device, comprising:

at least a processor, and a non-transitory memory with instructions thereon, wherein the instructions upon execution by the processor, cause the processor to:

receive a display operation for media content; and display a media content image of the media content in response to the display operation, wherein the media content image comprises a first image and a second image, the first image is in a clear display state, and the second image is in a blurry display state, wherein displaying the media content image of the media content, comprises displaying, in the clear display state, the first image in the media content image that is captured by a first capture apparatus, and displaying, in the blurry display state, the second image in the media content image that is captured by a second capture apparatus, wherein the first capture apparatus is a front camera of an electronic device and the second capture apparatus is a rear camera of the electronic device; or the first capture apparatus is a rear camera of the electronic device and the second capture apparatus is a front camera of the electronic device, and wherein the electronic device is a capture device for the media content.

10. The electronic device of claim 9, wherein the processor is further caused to:

display, in the clear display state, the first image located in a first area of the media content image, and display, image in the blurry display state, the second image located in a second area of the media content, wherein the first area and the second area are different image areas of the media content image.

11. The electronic device of claim 10, wherein the first image and the second image are captured by different capture apparatuses.

12. The electronic device of claim 11, wherein a size of the first area is less than or equal to a size of the second area.

13. The electronic device of claim 11, wherein a size of the first area is greater than a size of the second area.

14. The electronic device of claim 10, wherein the first area is a preset area of the media content image, and the second area is an image area other than the first area of the media content image.

15. The electronic device of claim 9, wherein after displaying the media content image of the media content, the processor is further configured to:

switch the second image from the blurry display state to the clear display state in response to a state switching operation for the second image.

16. The electronic device of claim 9, wherein after displaying the media content image of the media content, the processor is further configured to:

receive an image position adjustment operation for the media content; and adjust a relative position of the first image and the second image in response to the image position adjustment operation.

17. A non-transitory computer-readable storage medium, storing instructions that cause at least a processor to:

receive a display operation for media content; and display a media content image of the media content in response to the display operation, wherein the media content image comprises a first image and a second image, the first image is in a clear display state, and the second image is in a blurry display state, wherein displaying the media content image of the media content, comprises displaying, in the clear display state, the first image in the media content image that is captured by a first capture apparatus, and displaying, in the blurry display state, the second image in the media content image that is captured by a second capture apparatus, wherein the first capture apparatus is a front camera of an electronic device and the second capture apparatus is a rear camera of the electronic device; or the first capture apparatus is a rear camera of the electronic device and the second capture apparatus is a front camera of the electronic device, and wherein the electronic device is a capture device for the media content.

18. The non-transitory computer-readable storage medium of claim 17, wherein displaying the media content image of the media content comprises:

displaying, in the clear display state, the first image located in a first area of the media content image, and displaying, in the blurry display state, the second image located in a second area of the media content image, wherein the first area and the second area are different image areas of the media content image.

19. The non-transitory computer-readable storage medium of claim 18, wherein the first image and the second image are captured by different capture apparatuses.

* * * * *